United States Patent
Carlton

(10) Patent No.: US 6,612,894 B2
(45) Date of Patent: *Sep. 2, 2003

(54) METHOD OF CALLING GAME USING A DIAPHRAGM GAME CALL HAVING AN INTEGRAL RESONANCE CHAMBER

(75) Inventor: L. Wayne Carlton, Montrose, CO (US)

(73) Assignee: Hunter's Specialties, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/683,811

(22) Filed: Feb. 19, 2002

(65) Prior Publication Data

US 2002/0077019 A1 Jun. 20, 2002

Related U.S. Application Data

(63) Continuation-in-part of application No. 09/681,111, filed on Jan. 10, 2001, which is a continuation-in-part of application No. 09/086,637, filed on May 29, 1998, now Pat. No. 6,179,684.

(51) Int. Cl.[7] ............................................. A63H 5/00
(52) U.S. Cl. ............................... 446/202; 446/397
(58) Field of Search ........................ 446/202, 207, 446/208, 209, 397; 43/1, 2; 84/383 R, 383 A

(56) References Cited

U.S. PATENT DOCUMENTS

| | | |
|---|---|---|
| 1,052,525 A | 2/1913 | Smith |
| 2,093,453 A | 9/1937 | Kellotat |
| 3,583,094 A | 6/1971 | Tribell |
| 3,811,221 A | 5/1974 | Wilt |
| 3,815,283 A | 6/1974 | Piper |
| 4,138,800 A | 2/1979 | Lege |
| 4,218,845 A | 8/1980 | Evans et al. |
| 4,335,539 A | 6/1982 | Jones |
| 4,341,037 A * | 7/1982 | Moss .......................... 446/204 |
| 4,483,097 A | 11/1984 | Piper |
| 4,614,503 A | 9/1986 | Skoda |
| 4,752,270 A | 6/1988 | Morton |
| 4,888,903 A | 12/1989 | Knight et al. |
| 4,897,067 A | 1/1990 | Piper |
| 4,950,198 A | 8/1990 | Repko, Jr. |
| 4,950,201 A * | 8/1990 | Sceery ........................ 446/207 |
| 4,960,400 A | 10/1990 | Cooper |
| 4,976,648 A | 12/1990 | Meline |
| 5,061,220 A * | 10/1991 | Cooper ........................ 446/208 |
| 5,122,088 A | 6/1992 | Meline |
| 5,415,578 A | 5/1995 | Jacobsen |
| 5,445,551 A | 8/1995 | Ady |
| 5,520,567 A * | 5/1996 | Jacobsen .......................... 43/2 |
| 5,735,725 A | 4/1998 | Primos |
| 5,785,574 A * | 7/1998 | Sears .......................... 446/208 |
| 5,803,785 A | 9/1998 | Primos, Jr. et al. |
| 5,885,125 A | 3/1999 | Primos |
| 5,910,039 A * | 6/1999 | Primos et al. ............... 446/207 |

OTHER PUBLICATIONS

The Call Masters 1996–97 Catalog, pp. 1–2, Copyright 1995.
Woods Wise Products 1996–97 Catalog.

* cited by examiner

*Primary Examiner*—Jacob K. Ackun
(74) *Attorney, Agent, or Firm*—Simmons, Perrine, Albright & Ellwood PLC

(57) ABSTRACT

A diaphragm game call having an integral dome-shaped resonant cavity having a tone trough recessed region therein, the dome being coupled to and disposed above a frame containing a latex diaphragm and a flexible game call having a flexible sound chamber coupled to a multi-part mouthpiece assembly which includes therein a removable diaphragm with a dome-shaped resonant cavity.

11 Claims, 5 Drawing Sheets

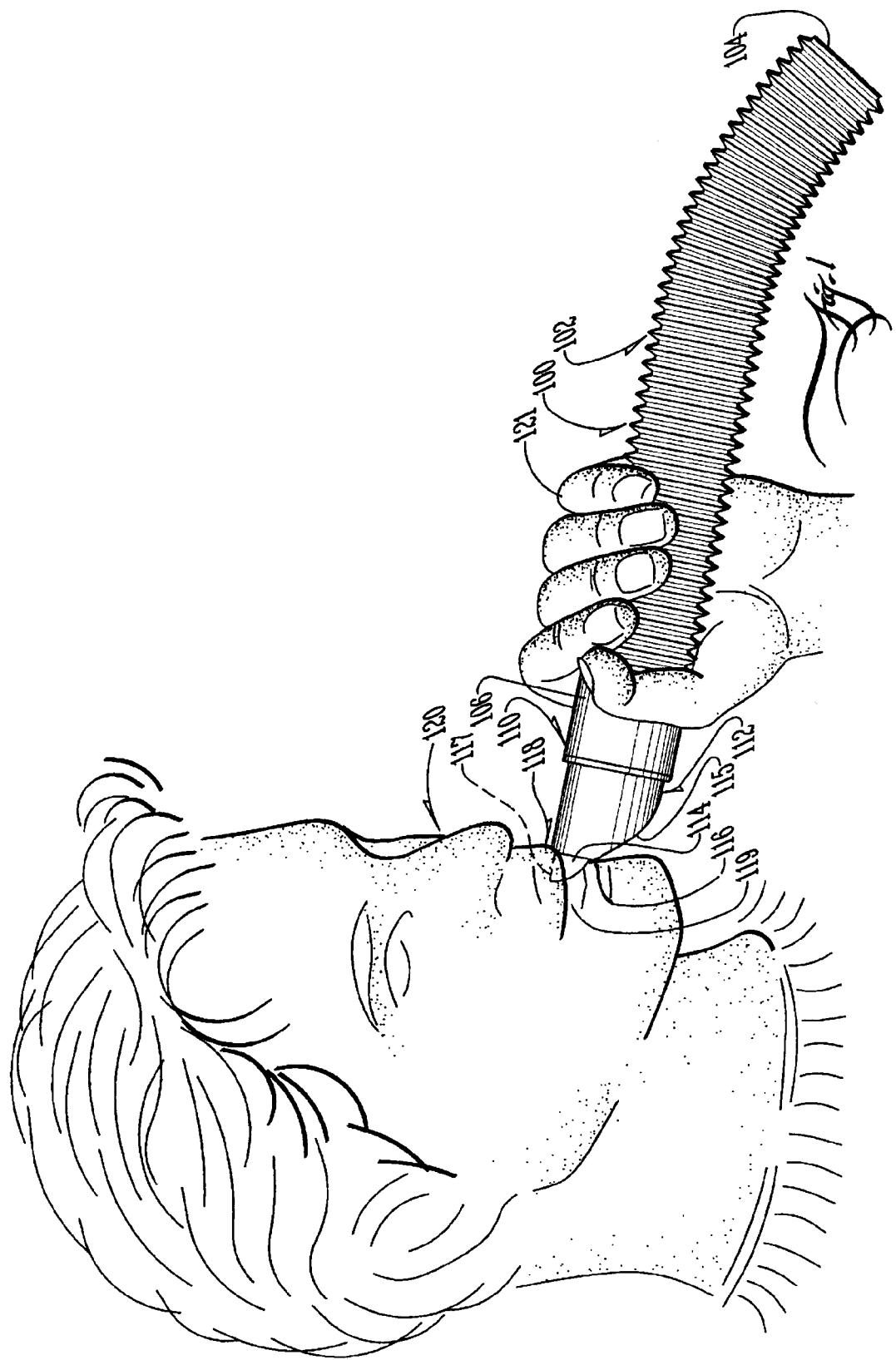

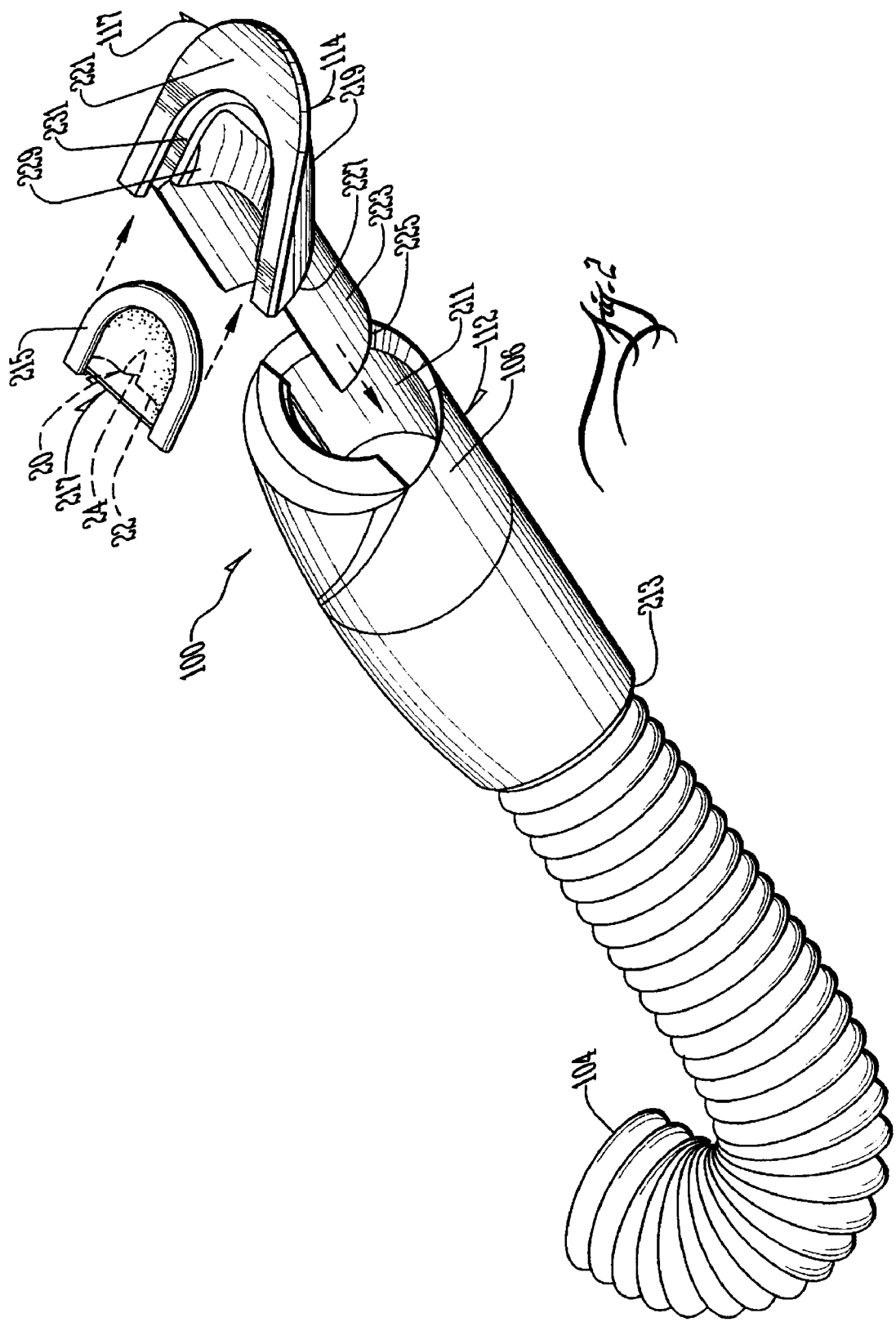

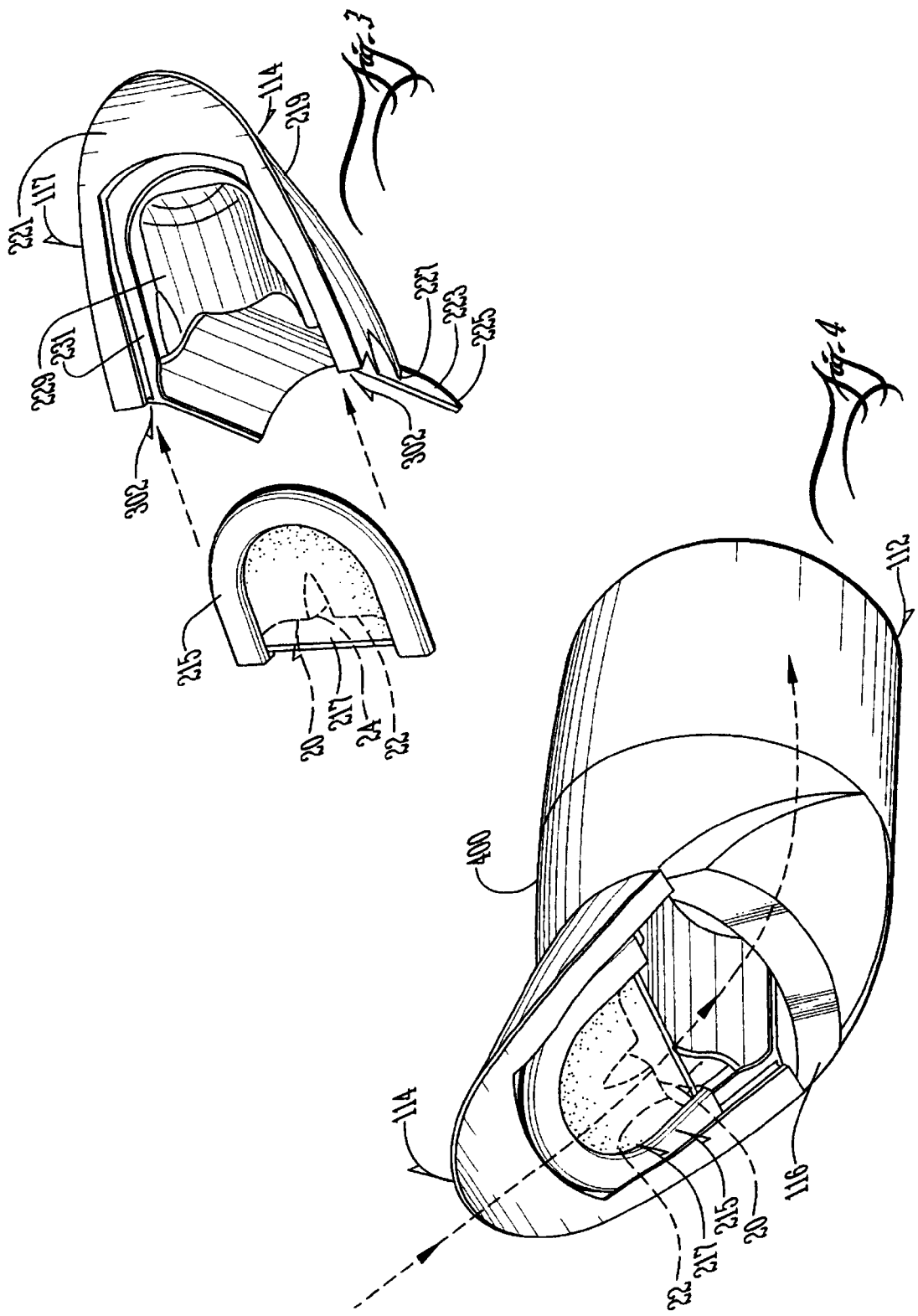

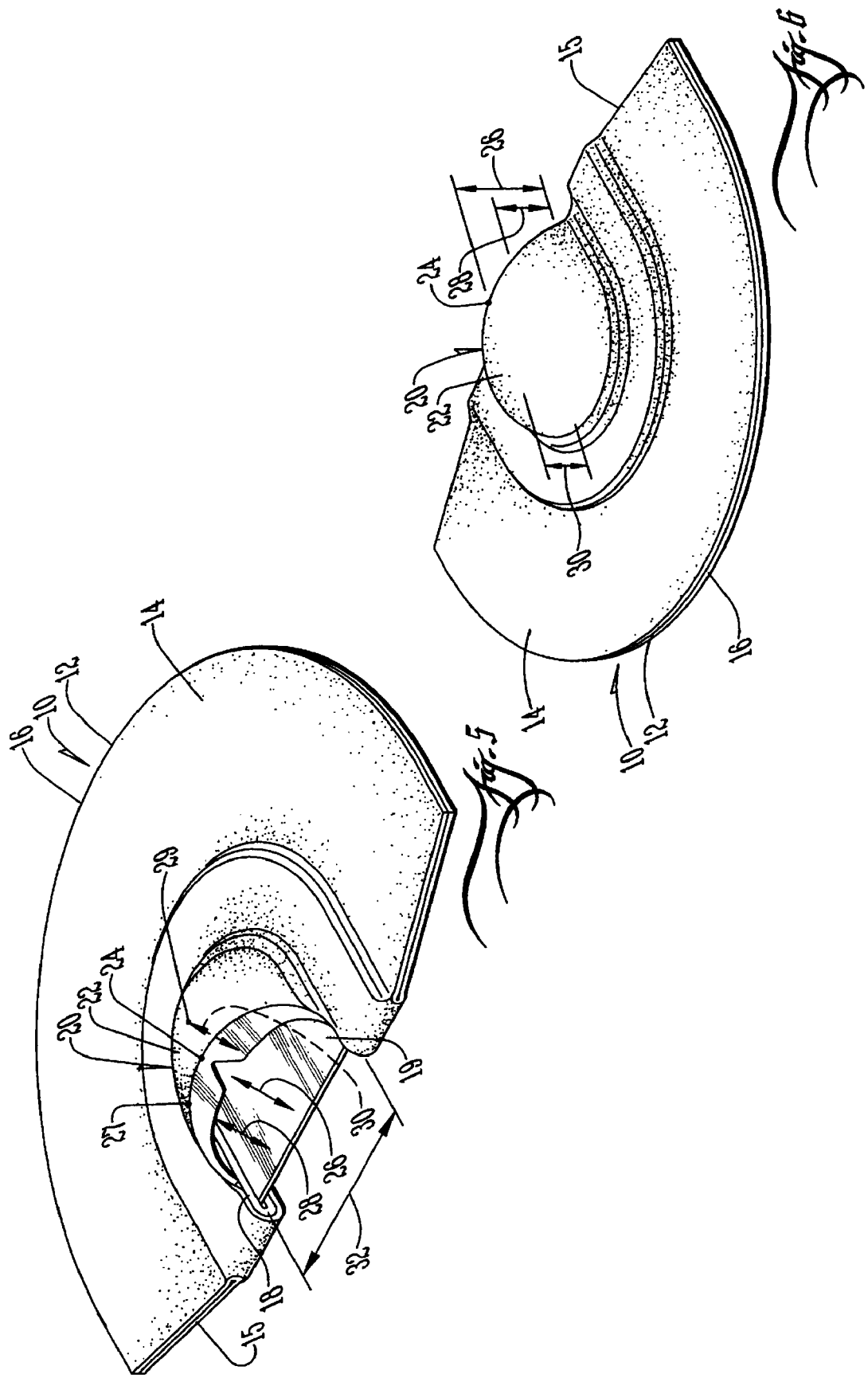

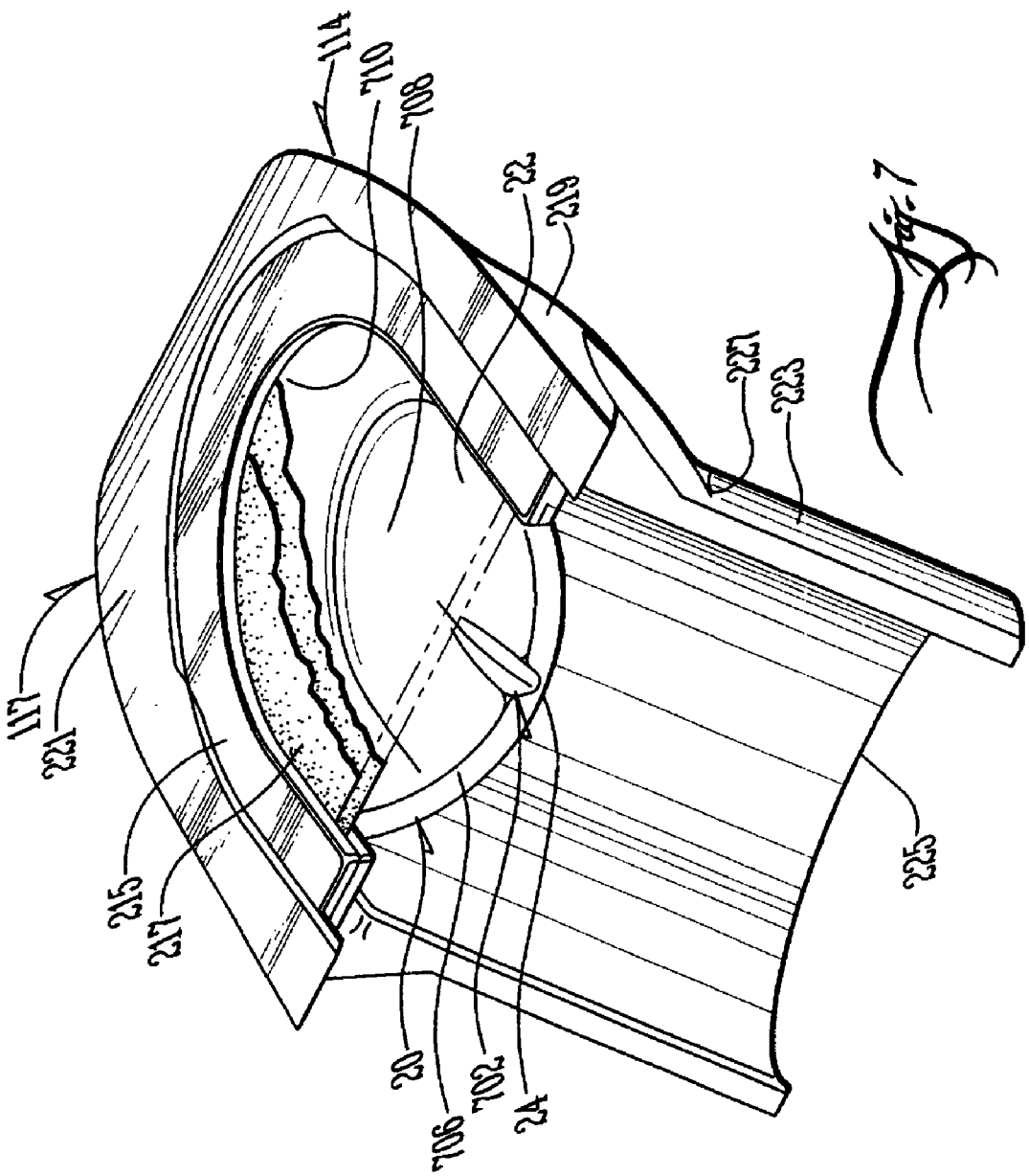

METHOD OF CALLING GAME USING A DIAPHRAGM GAME CALL HAVING AN INTEGRAL RESONANCE CHAMBER

CROSS REFERENCE TO RELATED APPLICATIONS

This application is a continuation-in-part application of an application entitled "METHOD OF CALLING GAME USING A DIAPHRAGM GAME CALL HAVING AN INTEGRAL RESONANCE CHAMBER", which was filed on Jan. 10, 2001 by L. Wayne Carlton, and having Ser. No. 09/681,111, which is itself a continuation-in-part application of the application entitled "FLEXIBLE GAME CALL WITH REPLACEABLE DIAPHRAGM" by L. Wayne Carlton filed on May 29, 1998, and having Ser. No. 09/086,637, now issued as U.S. Pat. No. 6,179,684 B1, issued Jan. 30, 2001 which are all incorporated herein in their entirety by this reference.

BACKGROUND OF INVENTION

In the past, hunters have often used diaphragm game calls which consist of a simple single or multiple layered latex reed in a taped "U"-shaped flexible frame. While these types of diaphragm calls and others have enjoyed considerable use in the past, they have several serious drawbacks. First of all, the typical diaphragm call forms the bottom end of a resonant chamber where the top end is the roof of the caller's mouth. This causes to exist a wide variation, across several callers, in the sounds produced by such calls, owing to the variations in the mouth shapes of these several callers. Similarly, because the typical diaphragm call will properly seal in only a small range of positions in a single caller's mouth, it is often difficult for a single caller to produce sounds having a wide tonal variety. Secondly, these diaphragm calls generally require the hunter or caller to possess a relatively high level of skill. The typical diaphragm call must be carefully sealed to the roof of the mouth of the caller before the desired sounds can be produced. Lastly, many hunters experience a gag reflex when attempting to seal a typical diaphragm call to the roof of their mouth.

Consequently, there exists a need for improvement in game calls which overcome the above-stated problems.

SUMMARY OF INVENTION

It is an object of the present invention to provide the hunter with a relatively easy method of generating more precise tones.

It is a feature of the present invention to include a resonant sound chamber integrally coupled with the diaphragm call.

It is an advantage of the present invention to provide for increased control over the size of the sound chamber about the latex reed.

It is another object of the present invention to provide an improved apparatus and method for blowing an "in-the-mouth" diaphragm call without causing the common gag reflexes and without having the dome chamber engaging the roof of the mouth of the caller.

It is an advantage of the present invention to eliminate an otherwise present gag reflex in some hunters by not requiring the hunter to blow as hard as with some prior art diaphragm calls.

It is another advantage of the present invention to provide for ways to produce variations in the sound output of diaphragm calls.

It is another feature of the present invention to include the diaphragm of the present invention as a removable single or multi-layer diaphragm within the game call.

It is yet another advantage of the present invention to extend the useful life of the entire game call by allowing replacement of internal pre-stretched diaphragms.

It is yet another feature of the present invention to include a recessed region or tone trough formed in the underside of the dome.

It is yet another advantage of the present invention to provide additional space under the dome where the diaphragm can vibrate and still not contact the underside of the dome.

It is yet another advantage of the present invention to provide a space for vibration even when the diaphragm touches portions of the underside of the dome. This provides for the ability to have two tuned tones from a single call.

The present invention is an apparatus for producing sound which is designed to satisfy the aforementioned needs, provide the previously stated objects, include the above-listed features, and achieve the already articulated advantages. In the present invention, the problems associated with limited tone precision, gag reflexes owing to engagement with the roof of the mouth, and difficulty in blowing a diaphragm call, have been addressed.

Accordingly, the present invention is a method and apparatus for providing a sound of game which includes an "in-the-mouth" diaphragm having a resonant chamber integrally disposed thereon and an elongated flexible sound chamber call using the integral resonant chamber diaphragm therein.

BRIEF DESCRIPTION OF DRAWINGS

The invention may be more fully understood by reading the following description of the preferred embodiments of the invention, in conjunction with the appended drawings wherein:

FIG. 1 is a perspective view of a call of the present invention showing the call immediately before it is fully inserted in the mouth of an operator.

FIG. 2 is an enlarged exploded perspective view of the mouthpiece assembly of the call of FIG. 1 wherein the dashed lines show the direction of motion required for reassembly.

FIG. 3 is an exploded view of the diaphragm holder and diaphragm of FIG. 2 showing a slot for receiving the diaphragm having an integral resonant chamber.

FIG. 4 is a perspective view of the mouthpiece of FIG. 1 in an assembled configuration, with the dotted line included to show direction of airflow.

FIG. 5 is an enlarged reed side perspective view of the diaphragm of the present invention having the integral resonant chamber thereon.

FIG. 6 is another perspective view of the diaphragm of the present invention having an integral resonant chamber, which is shown from a different direction from that shown in FIG. 5.

FIG. 7 is a perspective view of the inside of the dome shown in FIG. 5, which shows the tone trough recessed region in the dome underside. FIG. 7 also depicts the inside of the inverted dome shown in FIGS. 2–4.

DETAILED DESCRIPTION

Now referring to the drawings wherein like numerals refer to like matter throughout, and more particularly to FIG. 1, there is shown a perspective view of the game call of the present invention, generally designated 100, having a flexible sound chamber 102, which is preferably a flexible and/or expandable hose having an inside diameter between 1 and 1½ inches. Such flexible and expandable tubes are generally available in the marketplace and are typically made of plastic, rubber, or other pliable material. In some embodiments of the present invention, a megaphone may be coupled to the end of the flexible hose. Flexible sound chamber 102 is shown having an exhaust opening 104 at a distal end and a sound chamber intake end 106 at a proximal end.

Call 100 is also shown having a mouthpiece assembly 110 which includes a mouthpiece barrel 112, having coupled thereto a diaphragm holder 114, which is disposed adjacent to a lip stop portion 116 of mouthpiece barrel 112; tip 117 of diaphragm holder 114 is inserted into the oral cavity 118 of operator 120 until lower lip 119 of operator 120 contacts lip stop 116. Mouthpiece barrel 112 may be a lightweight rigid hollow member which is made of plastic, wood, foam, or other suitable material. Barrel 112 is shown having a lip stop 116 and a chin relief area 115 disposed at a proximal end. Diaphragm holder 114 is preferably a rigid material which may be similar or identical to material of barrel 112. As with barrel 112, the material for diaphragm holder 114 is preferably rugged, rigid, non-porous, light-weight, and inexpensive. However, any material which has one or more of these characteristics could be substituted for certain applications.

Also shown in FIG. 1 is the hand 121 of an operator grasping the call 100.

Now referring to FIG. 2, there is shown an enlarged exploded perspective view of the call 100 of FIG. 1 wherein the dashed lines show the direction of motion required for reassembly. Barrel 112 is shown having a barrel intake 211 and a barrel exhaust 213. Also shown is C-ring 215, which is used to support diaphragm 217. Preferably, C-ring 215 is a bi-level C-ring which includes an area between each level for receiving and retaining a diaphragm disposed therein. C-ring 215 and diaphragm 217 are easily removed for replacement. Diaphragm 217 may be a plastic material such as latex, but other suitable materials, such as paper, rubber, or metal foil, could be substituted. Diaphragm 217 may be a single or a multi-layer diaphragm. Also, C-ring 215 and diaphragm 217 could be adjusted and tuned, during the design and manufacturing phases of construction, to achieve different sound, depending upon the desired effect. A resonant cavity dome 20 is shown disposed under diaphragm 217. Dome 20 may be a rigid molded plastic member 22 which drops below the diaphragm 217 from the C-ring 215 to reach a downwardly extending apex 24 where it has a maximum drop below the diaphragm 217. Adjustments in materials, dimensions, and positioning can be used to affect the output of the call. It should be readily apparent that the dome 20 essentially creates a second smaller sound chamber within a larger sound chamber. Diaphragm holder 114 is shown having a top side 219 and a bottom side 221 and further having a diaphragm holder shank 223, having a shank distal end 225 and a shank proximal end 227. Diaphragm holder 114 is shown having a tone trough 229 disposed internally therein and further having a ring ledge 231 for receiving C-ring 215. Call 100 is designed to provide substantial airflow over the diaphragm when the call is blown.

Now referring to FIG. 3, there is shown an exploded view of the diaphragm holder and diaphragm of FIG. 2 showing the slot therein for receiving the diaphragm.

The dotted lines represent the direction of motion required of the C-ring 215 for reassembly in which C-ring 215 would rest upon ring ledge 231 and would be placed within slot 302 of the diaphragm holder 114.

Now referring to FIG. 4, there is shown a perspective view of the mouthpiece assembly of FIG. 1 in an assembled configuration, with the dotted line indicating the direction of airflow during normal operation and further showing an air passage 400 which is bounded by the diaphragm 217, the C-ring 215, and the lip stop portion 116 of mouthpiece barrel 112.

In operation, the game call 100 is inserted into the oral cavity 118 of operator 120, so that lip 119 contacts lip stop 116 and diaphragm holder 114 is largely enclosed in oral cavity 118. The operator 120 expresses air outwardly and across diaphragm 217 and through air passage 400 and there on through the hollow portion of barrel 112 and the flexible sound chamber 102 and ultimately exiting game call 100 through exhaust opening 104, which is manipulated to point in different directions.

In operation, the call is assembled as follows: the diaphragm is slid into the diaphragm holder, which is inserted into the mouthpiece barrel, which is inserted into the flexible sound chamber.

Now referring to FIG. 5, there is shown an enlarged view of an "in-the-mouth" diaphragm call of the present invention, generally designated 10, having a peripheral edge 12 and a flexible tape top surface 14 which extends over a C- or U-shaped frame 18. Except for the resonant cavity dome 20 and how it is attached, deployed and used, the basic frame, diaphragm, and tape configurations are well known in the art. Dome 20 forms the top side of a small resonant cavity of fixed size and shape. In a typical prior art diaphragm call, the top part of the resonant cavity is formed by the roof of the mouth of the caller. The present invention creates a diaphragm call with a smaller sound chamber (the dome 20) inside a larger sound chamber (the usual sound chamber sealed by the tape and defined by the roof of the caller's mouth and the call). Generally, dome 20 is a molded member 22 approximately in the shape of ¼ of a spherical shell in that dome 20 has an apex 24 which has a maximum height 26 from the apex 24 to the diaphragm 19. The height 28 represents a height of the dome 20 at a first intermediate point 27 along the surface of the dome 20 and between the apex 24 and the frame 18. Height 28 is less than maximum height 26. Height 30 represents a height at a second intermediate point 29, taken in an orthogonal relationship with respect to a line drawn from the apex 24 to first intermediate point 27. Height 30, like height 28, is less than the maximum height 26. While a spherical-shaped dome 20 is mentioned here, this is merely for convenience in the description. It should be understood that any non-spherical concave dome may be substituted. In fact, in a preferred embodiment, the maximum height 26 is less than a maximum dome width 32.

Dome 20 may be a separate piece that is taped to a typical C- or U-shaped frame, or it may be molded or otherwise fashioned to be integral with the frame 18. In either arrangement, it may be preferred to have the top surface 14 of the tape extend over the dome 20. Dome 20 is rigid so as to maintain its shape and have a more precisely defined sound chamber.

Now referring to FIG. 6, there is shown another perspective view of the diaphragm of FIG. 5 taken from a different direction.

In operation, the "in-the-mouth" diaphragm call 10 of the present invention can be used as follows:

In one arrangement, the call 10 is placed in the caller's mouth, so that the proximal edge 15 of the call 10 is in the front of the mouth, generally behind the teeth of the caller. The distal edge 16 is then disposed deeper inside of the caller's mouth and extending therein. The flexible tape top surface seals the call 10 to the roof of the caller's mouth to form the large sound chamber. The apex 24 is disposed upwardly, extending in a direction toward the roof of the mouth of the caller, but preferably not touching the roof of the mouth of the caller. The dome becomes the second sound chamber inside the larger sound chamber.

Now referring to FIG. 7, there is a perspective view of the inside of the dome 20. It shows the tone trough or recessed region 702 as being a "V" shaped cut in the inner side of the dome 20. Tone trough 702 could be any shape suitable, such as a "U" shape or a rectangular channel. The tone trough 702 is shown gradually diminishing in depth as it extends along a line from the apex 24 on the free front edge 706 to the center bottom point 708 on the bottom edge 710. However, the depth of the tone trough 702 could also be constant or otherwise.

It is believed that the tone trough 702 is advantageous because it permits free vibration of the diaphragm when the diaphragm is blown against the inside of the dome 20, thereby prohibiting free vibration. The tone trough with its extra deep recessed region permits vibration of a small portion of diaphragm aligned with the tone trough.

It is thought that the method and apparatus of the present invention will be understood from the foregoing description, and it will be apparent that various changes may be made in the form, construct, steps and arrangement of the parts and steps without departing from the spirit and scope of the invention or sacrificing all of the material advantages. The form herein described being merely a preferred or exemplary embodiment thereof.

What is claimed is:

1. A game call comprising:
   a U-shaped frame having a top side and a bottom side, an exterior periphery and an interior periphery;
   a flexible diaphragm disposed in said U-shaped frame, between said top side and said bottom side; and,
   a rigid concave member, having a substantially semi-circular bottom edge coupled with said frame and defining a sealed sound chamber where one side of said sound chamber is said diaphragm and another side of said sound chamber is said concave member.

2. A call of claim 1 further comprising a U-shaped flexible member disposed around said exterior periphery of said U-shaped frame.

3. A call of claim 2 wherein said concave member is adapted and configured to permit said flexible diaphragm to generate sounds when said flexible diaphragm has been stretched beyond a point where, absent the concave member, no sound would be produced.

4. A call of claim 2 wherein said rigid concave member has an apex where a vertical separation from said flexible diaphragm is at a maximum;
   said apex having a recessed region therein, within which said diaphragm can vibrate despite said diaphragm otherwise contacting an underside of said rigid concave member.

5. A call of claim 4 wherein said rigid concave member has an increasing thickness dimension from said bottom edge to said apex, except for said recessed region.

6. A call of claim 5 wherein said recessed region has a "V" shaped cross section.

7. A call of claim 6 wherein said recessed region extends from a front free edge of said rigid concave member to an intermediate point above said diaphragm.

8. A call of claim 7 wherein said recessed region has a decreasing depth dimension, into said rigid concave member, as said recessed region extends further from said free front edge.

9. A call of claim 8 wherein said recessed region extends from said apex, along an arc line extending to a point at a center of said semi-circular bottom edge.

10. A game call comprising:
    a latex diaphragm for producing sound when air flows adjacent to said diaphragm;
    said diaphragm having a free front diaphragm edge;
    a U shaped diaphragm retaining frame coupled to said diaphragm for retaining all edges of said diaphragm, except said free front edge;
    a rigid dome fixed to said frame so as to prohibit relative movement between said rigid dome and said retaining frame;
    said dome having a front free dome edge disposed above said free front diaphragm edge;
    said dome further having a centrally disposed apex disposed above a central portion of said free front diaphragm edge;
    said rigid dome having a bottom edge with a U-shape and a bottom central point;
    said rigid dome having a recessed region therein disposed about an arc from said apex to said bottom central point;
    said recessed region being adapted for receiving therein said diaphragm when it is deflected into contact with an inside of said rigid dome; and,
    said recessed region having a "V" shaped cross section and a depth characteristic which decreases with distance from said apex along arc.

11. A game call of claim 10 wherein said rigid dome is a single rigid molded piece of plastic, and said diaphragm is a multi-layer diaphragm.

* * * * *

Disclaimer

6,612,894 — L. Wayne Carlton, Montrose, CO. METHOD OF CALLING GAME USING A DIAPHRAGM GAME CALL HAVING AN INTEGRAL RESONANCE CHAMBER. Patent dated Sep. 02, 2003. Disclaimer filed Jan. 29, 2004, by the assignee, Hunter's Specialties, Inc.

Hereby enter this disclaimer to all claims (1-11) of said patent.

*(Official Gazette May 31, 2005)*